United States Patent
El Khayat et al.

(10) Patent No.: US 10,182,465 B2
(45) Date of Patent: Jan. 15, 2019

(54) HANDLING OF CONTROL INTERFACE FAILURE IN MULTICAST TRANSMISSIONS VIA A CELLULAR NETWORK

(71) Applicant: Telefonaktiebolaget LM Ericsson (publ), Stockholm (SE)

(72) Inventors: Ibtissam El Khayat, Glons (BE); Björn Knuthammar, Linköping (SE); Jie Ling, Shanghai (CN); Tobias Ljungström, Järfälla (SE); Peter Werner, Linköping (SE); Qi Xia, Shanghai (CN); Tingyu Zhang, Shanghai (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 209 days.

(21) Appl. No.: 15/126,306

(22) PCT Filed: Jun. 3, 2014

(86) PCT No.: PCT/EP2014/061485
§ 371 (c)(1),
(2) Date: Sep. 15, 2016

(87) PCT Pub. No.: WO2015/185111
PCT Pub. Date: Dec. 10, 2015

(65) Prior Publication Data
US 2017/0086247 A1    Mar. 23, 2017

(51) Int. Cl.
*H04W 4/02* (2018.01)
*H04W 76/18* (2018.01)
(Continued)

(52) U.S. Cl.
CPC ........... *H04W 76/18* (2018.02); *H04L 12/189* (2013.01); *H04L 41/06* (2013.01); *H04W 76/38* (2018.02); *H04W 76/40* (2018.02); *H04W 88/16* (2013.01)

(58) Field of Classification Search
CPC ......... H04L 12/18; H04L 12/24; H04L 12/28; H04W 76/00; H04W 76/06
See application file for complete search history.

(56) References Cited

U.S. PATENT DOCUMENTS

| | | | |
|---|---|---|---|
| 2009/0011795 A1* | 1/2009 | Fukui | H04J 11/0093 455/561 |
| 2010/0097936 A1* | 4/2010 | Lee | H04L 1/0007 370/241 |
| 2012/0003977 A1* | 1/2012 | Iwamura | H04W 36/0033 455/436 |

OTHER PUBLICATIONS

3rd Generation Partnership Project, "3rd Generation Partnership Project; Technical Specification Group Core Network and Terminals; Restoration procedures (Release 12)," Technical Specification, 3GPP TS 23.007, v12.4.0, Mar. 1, 2014, pp. 1-85, 3GPP, France.
ONE2MANY, "Restart Counter increase after path failure recovery," 3GPP TSG CT4 Meeting #64, C4-140281, Change Request, Version 12.3.0, Guangzhou, The People's Republic of China, Jan. 20, 2014, pp. 1-4.
3rd Generation Partnership Project, "3rd Generation Partnership Project; Technical Specification Group Core Network and Terminals; Restoration procedures (Release 12)," Technical Specification, 3GPP TS 23.007, v12.3.0, Dec. 1, 2013, pp. 1-85, 3GPP, France.
(Continued)

*Primary Examiner* — Anez C Ebrahim
(74) *Attorney, Agent, or Firm* — Coats & Bennett, PLLC

(57) ABSTRACT

A control node (140; 150) of a cellular network establishes one or more control plane sessions with a gateway node (160). On the basis of these one or more control plane sessions with the gateway node (160), the control node (140; 150) also establishes one or more control plane sessions with one or more radio access network nodes (112, 114; 122, 24) to control multicast transmissions by the one or more radio access network nodes (112, 14; 122, 124). Further, the control node (140; 150) detects a connection failure to the gateway node (160). When detecting the connection failure, the control node (140; 150) starts a first timer. Further, also the gateway node (160) detects the connection failure. When detecting the connection failure, the gateway node (160) starts a second timer. The second timer is configured with a
(Continued)

longer duration than the first timer. In response to expiry of the first timer, the control node (140; 150) locally deletes the one or more control plane sessions with the gateway node (160) and with the one or more control plane sessions with the one or more radio access network nodes (112, 114; 122, 124). In response to expiry of the second timer, the gateway node (160) triggers a reaction to the connection failure by the gateway node (160), e.g., selection of an alternative control node.

25 Claims, 9 Drawing Sheets

(51) Int. Cl.
*H04W 76/38* (2018.01)
*H04W 76/40* (2018.01)
*H04L 12/18* (2006.01)
*H04L 12/24* (2006.01)
*H04W 88/16* (2009.01)

(56) References Cited

OTHER PUBLICATIONS

Alcatel-Lucent, et al., "Sm path failure handling," 3GPP TSG CT WG4 Meeting #60, C4-130401, Change Request, Version 11.4.0, San Jose Del Cabo, MX, Jan. 28, 2013, pp. 1-5.

Ericsson, "Discussion on re-establishing control path during path failure for eMBMS restoration," 3GPP TSG CT4 Meeting #61, C4-130593, Agenda Item 6.7, Chengdu, China, May 20, 2013, pp. 1-4.

3rd Generation Partnership Project, "3rd Generation Partnership Project; Technical Specification Group Services and System Aspects; Multimedia Broadcast/Multicast Service (MBMS); Architecture and functional description (Release 12)," Technical Specification, 3GPP TS 23.246, v12.0.0, Dec. 1, 2013, pp. 1-66.

3rd Generation Partnership Project, "3rd Generation Partnership Project; Technical Specification Group Services and System Aspects; Multimedia Broadcast/Multicast Service (MBMS); Architecture and functional description (Release 11)," Technical Specification, 3GPP TS 23.246, v11.0.0, Dec. 1, 2011, pp. 1-66.

* cited by examiner

HANDLING OF CONTROL INTERFACE FAILURE IN MULTICAST TRANSMISSIONS VIA A CELLULAR NETWORK

TECHNICAL FIELD

The present invention relates to methods for transmitting multicast data and to corresponding devices.

BACKGROUND

In cellular networks, e.g., as specified by 3GPP (3$^{rd}$ Generation Partnership Project), multicast and broadcast transmission modes have been introduced, e.g., for the purpose of delivering multimedia content. An example of such broadcast and multicast transmission mode is the Multimedia Broadcast Multicast Service (MBMS), e.g., as specified in 3GPP TS 22.346 V11.0.0 (2012-09) and 3GPP TS 23.246 V12.0.0 (2013-12).

In the MBMS architecture as defined in 3GPP TS 23.346, a gateway node, referred to as MBMS-GW, which distributes MBMS data to radio access network (RAN) nodes, also interacts with a control node referred to as MME (Mobility Management Entity). For this purpose, an interface referred to as Sm is provided between the MBMS-GW and the MME. The Sm interface is based GTP (GPRS Tunneling Protocol) and UDP (User Datagram Protocol), which makes the Sm interface susceptible to network disturbance. If the connection between the MBMS-GW and the MME via the Sm interface fails, this for example has the effect that the MBMS-GW is not able to send messages to the MME, and therefore it is for example not possible to start, stop, or modify MBMS sessions which are controlled by this MME.

In 3GPP TS 23.007 V12.4.0 (2014-03) procedures for handling a failure of the Sm interface is specified. These procedures involve using a maximum path failure duration timer in the MME, which is started when the MME detects the failure of the Sm interface, and a maximum path failure duration timer in the MBMS-GW, which is started when the MBMS-GW detects the failure of the Sm interface. During a transient failure of the Sm interface (in which the connection between the MBMS-GW and the MME recovers before the maximum path failure duration timer in the MBMS-GW expires), the MBMS-GW may select an alternative MME and send new MBMS Session Start Request to this alternative MME. In the case of a MBMS Session Update Request or MBMS Session Stop Request, the MBMS-GW may select an alternative MME, send a MBMS Session Start Request message to this alternative MME and, if successful, send subsequently the MBMS Session Update Request or MBMS Session Stop Request to this alternative MME. After having selected an alternative MME, the MBMS-GW shall consider the MME answering to the MBMS Start Request as the controlling MME for the MBMS session and send any subsequent MBMS Session Update or MBMS Session Stop for this MBMS Session to this MME. When detecting a non-transient Sm path failure (in which the connection between the MBMS-GW and the MME does not recover before the maximum path failure duration timer in the MBMS-GW expires), the MBMS-GW may move the control of all the affected active MBMS sessions to an alternative MME. The alternative MME is selected from the same MME pool as the original MME to which the connection over the Sm interface failed.

According to 3GPP TS 23.007, the maximum path failure duration timer of the MBMS-GW should be configured with a shorter value than the maximum path failure duration timer of the MME to avoid interrupting active MBMS sessions upon a non-transient Sm path failure. This also means that any reaction to the non-transitory failure will first occur at the MBMS-GW.

In the above way of handling the non-transitory failure of the Sm interface, MBMS-GW re-establishes not only the control plane with the alternative MME, but also re-establishes the user plane, even if the user plane may actually be unaffected by the network disturbance which resulted in failure of the Sm interface. This may adversely affect user experience. Further, if no alternative MME is available, all user plane traffic of the MBMS session will be stopped. Further, the re-establishment of the control plane may result in a situation in which that parts of the control plane with the old MME co-exist with the newly established control plane. Such parts may for example be control plane sessions between the old MME and radio access network (RAN) nodes, such as MCEs (Multicast Coordination Entities). This ambiguity may cause various problems. For example, an interface failure between an MCE and the old MME may trigger a complete re-establishment of the control plane with the old MME. Further, an interface failure between an MCE and both the old MME and new MME may have the effect that the MCE does not know which one is the current controlling MME and incorrect selection of the old MME when re-establishing the control plane from the MCE. Such issues may be addressed by causing the MCE to reset the old MME once the new MME assumes control responsibility. However, since the number of MCEs involved in an MBMS session may be huge, this may cause undesirable signaling overhead.

Accordingly, there is a need for techniques which allow for efficiently addressing an interface failure between a gateway and control node which are handling multicast transmissions in a cellular network.

SUMMARY

According to an embodiment of the invention, a method of managing multicast transmissions in a cellular network is provided. According to the method, a control node of the cellular network establishes one or more control plane sessions with a gateway node. On the basis of these one or more control plane sessions with the gateway node, the control node also establishes one or more control plane sessions with one or more RAN nodes to control multicast transmissions by the one or more RAN nodes. Further, the control node detects a connection failure to the gateway node. When detecting the connection failure, the control node starts a first timer. The timer is configured with a shorter duration than a second timer, which is started by the gateway node when detecting the connection failure and triggers a reaction to the connection failure by the gateway node. In response to expiry of the first timer, the control node locally deletes context information associated with the one or more control plane sessions with the gateway node and with the one or more control plane sessions with the one or more RAN nodes.

According to a further embodiment of the invention, a method of managing multicast transmissions in a cellular network is provided. According to the method, a gateway node of the cellular network establishes one or more control plane sessions with a control node of the cellular network. Further, the gateway node establishes one or more user plane sessions for the multicast transmissions with one or more RAN nodes controlled by the control node. Further, the gateway node detects a connection failure to the control node. When detecting the connection failure, the gateway node starts a first timer. The first timer is configured with a longer duration than a second timer, which is started by the control node when detecting the connection failure and triggers a reaction to the connection failure by the control node. In response to expiry of the first timer, the gateway node triggers a reaction to the connection failure by the gateway node.

According to a further embodiment of the invention, a method of managing multicast transmissions in a cellular network is provided. According to the method, a control node of the cellular network establishes one or more control plane sessions with a gateway node. On the basis of these one or more control plane sessions with the gateway node, the control node also establishes one or more control plane sessions with one or more RAN nodes to control multicast transmissions by the one or more RAN nodes. Further, the control node detects a connection failure to the gateway node. When detecting the connection failure, the control node starts a first timer. Further, also the gateway node detects the connection failure. When detecting the connection failure, the gateway node starts a second timer. The second timer is configured with a longer duration than the first timer. In response to expiry of the first timer, the control node locally deletes context information associated with the one or more control plane sessions with the gateway node and with the one or more control plane sessions with the one or more RAN nodes. In response to expiry of the second timer, the gateway node triggers a reaction to the connection failure by the gateway node.

According to a further embodiment of the invention, a control node for a cellular network is provided. The control node comprises an interface to a gateway node. Further, the control node comprises an interface to one or more RAN nodes. Further, the control node comprises at least one processor. The at least one processor is configured to establish one or more control plane sessions with the gateway node. Further, the at least one processor is configured to establish, on the basis of the one or more control plane sessions with the gateway node, one or more control plane sessions with the one or more RAN nodes to control multicast transmissions by the one or more RAN nodes. Further, the at least one processor is configured to detect a connection failure to the gateway node and, when detecting the connection failure, start a first timer. The first timer is configured with a shorter duration than a second timer, which is started by the gateway node when detecting the connection failure and triggers a reaction to the connection failure by the gateway node. Further, the at least one processor is configured to, in response to expiry of the first timer, locally delete context information associated with the one or more control plane sessions with the gateway node and with the one or more control plane sessions with the one or more RAN nodes.

According to a further embodiment of the invention, a gateway node for a cellular network is provided. The gateway node comprises an interface to one or more RAN nodes. Further, the gateway node comprises an interface to a control node which is responsible for controlling the one or more RAN nodes. Further, the gateway node comprises at least one processor. The at least one processor is configured to establish one or more control plane sessions with the control node. Further, the at least one processor is configured to establish one or more user plane sessions of multicast transmissions by said one or more RAN nodes. Further, the at least one processor is configured to detect a connection failure to the control node and, when detecting the connection failure, start a first timer. The first timer is configured with a longer duration than a second timer, which is started by the control node when detecting the connection failure and triggers a reaction to the connection failure by the control node. Further, the at least one processor is configured to, in response to expiry of the first timer, trigger a reaction to the connection failure of the interface by the gateway node.

According to a further embodiment of the invention, a system for managing multicast transmissions in a cellular network is provided. The system comprises a control node which is responsible for controlling one or more RAN nodes. Further, the system comprises a gateway node. The control node is configured to establish, via an interface to the gateway node, one or more control plane sessions with the gateway node. Further, the control node is configured to establish, on the basis of the one or more control plane sessions with the gateway node, one or more control plane sessions with the one or more RAN nodes to control multicast transmissions by the one or more RAN nodes. Further, the control node is configured to detect a connection failure of the interface to the gateway node and, when detecting the connection failure, start a first timer. Further, the control node is configured to, in response to expiry of the first timer, locally delete context information associated with the one or more control plane sessions with the gateway node and with the one or more control plane sessions with the one or more RAN nodes. The gateway node is configured to establish one or more user plane sessions of the multicast transmissions by said one or more RAN nodes. Further, the gateway node is configured to detect the connection failure and, when detecting the connection failure, start a second timer. The second timer is configured with a longer duration than the first timer. Further, the gateway node is configured to, in response to expiry of the second timer, trigger a reaction to the connection failure by the gateway node.

According to a further embodiment of the invention, a computer program or computer program product is provided, e.g., in the form of a non-transitory storage medium, which comprises program code to be executed by at least one processor of a control node of a cellular network. Execution of the program code causes the at least one processor to establish one or more control plane sessions with the gateway node. Further, execution of the program code causes the at least one processor to establish, on the basis of the one or more control plane sessions with the gateway node, one or more control plane sessions with the one or more RAN nodes to control multicast transmissions by the one or more RAN nodes. Further, execution of the program code causes the at least one processor to detect a connection failure to the gateway node and, when detecting the connection failure, start a first timer. The first timer is configured with a shorter duration than a second timer, which is started by the gateway node when detecting the connection failure and triggers a reaction to the connection failure by the gateway node. Further, execution of the program code causes the at least one processor to, in response to expiry of the first timer, locally delete context information associated with the one or more control plane sessions with the gateway node and with the one or more control plane sessions with the one or more RAN nodes.

According to a further embodiment of the invention, a computer program or computer program product is provided, e.g., in the form of a non-transitory storage medium, which comprises program code to be executed by at least one processor of a gateway node of a cellular network. Execution of the program code causes the at least one processor to establish one or more control plane sessions with the control node. Further, execution of the program code causes the at least one processor to establish one or more user plane sessions of multicast transmissions by said one or more RAN nodes. Further, execution of the program code causes the at least one processor to detect a connection failure to the control node and, when detecting the connection failure, start a first timer. The first timer is configured with a longer duration than a second timer, which is started by the control node when detecting the connection failure and triggers a reaction to the connection failure by the control node. Further, execution of the program code causes the at least one processor to, in response to expiry of the first timer, trigger a reaction to the connection failure of the interface by the gateway node.

Details of such embodiments and further embodiments will be apparent from the following detailed description of embodiments.

DETAILED DESCRIPTION OF EMBODIMENTS

Figure 1:
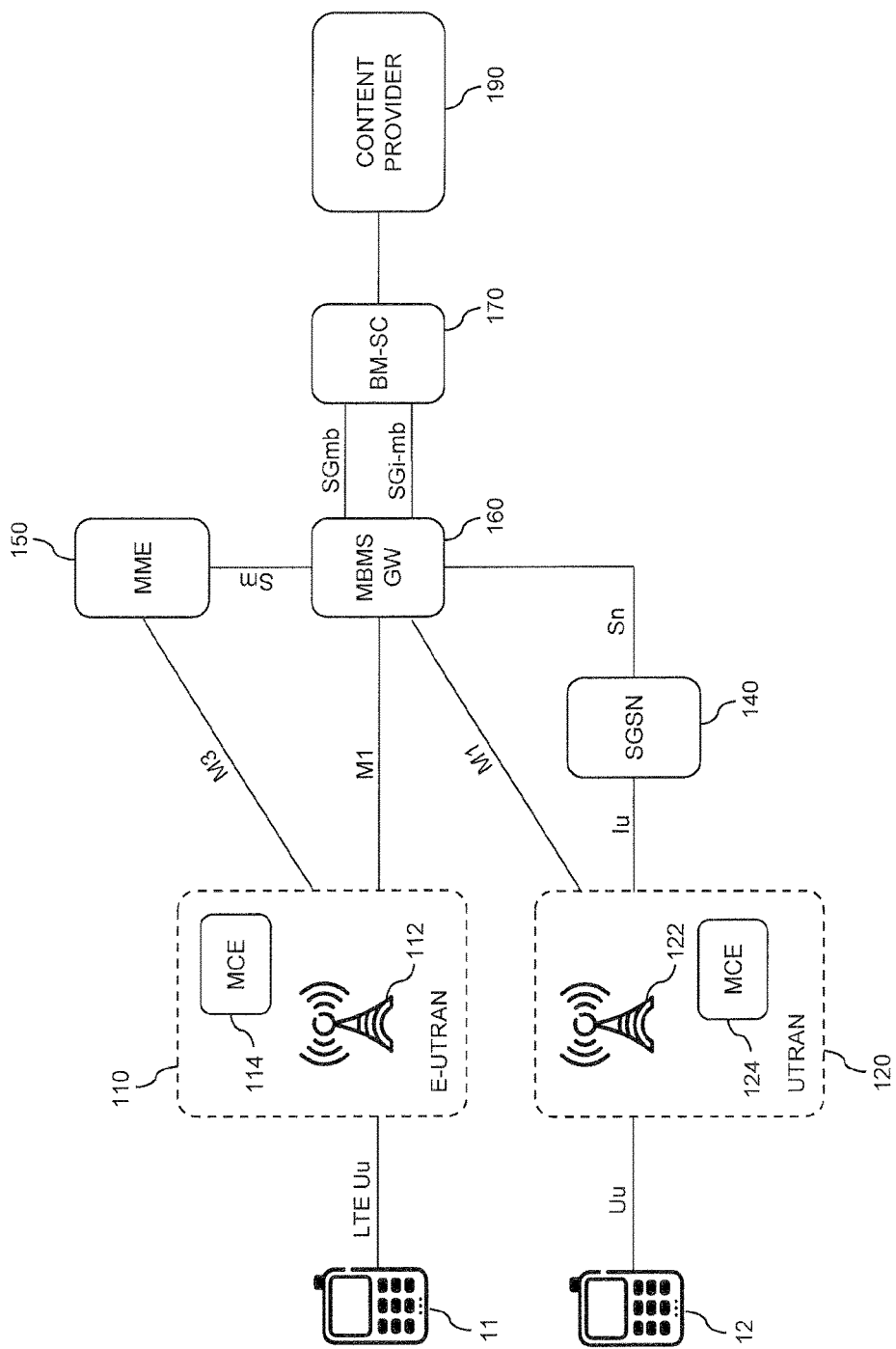
FIG. 1 schematically illustrates a multicast transmission architecture which is based on a control node and a gateway node which are configured to handle connection failures according to an embodiment of the invention.

In the following, concepts according to embodiments of the invention will be explained in more detail by referring to the accompanying drawings. The illustrated concepts relate to handling data traffic in a data communication system. Specifically, the concepts relate to managing multicast transmissions in a cellular network. The cellular network may for example be based on the LTE (Long Term Evolution) technology specified by 3GPP, and an MBMS architecture as for example described in 3GPP TS 23.246 may be utilized for performing the multicast transmissions. However, it is to be understood that the cellular network could implement other technologies as well, e.g., UMTS (Universal Mobile Telecommunications System) or GSM (Global System for Mobile Communication) in connection with GPRS (General Packet Radio Service). The multicast transmissions generally include transmissions which are intended to be simultaneously received by multiple recipients, e.g., UEs connected to the cellular network. These transmissions may be performed in a broadcast mode, in which the transmissions are intended to be received by all UEs in a given coverage area of the cellular network, or in a multicast mode, in which the transmissions are intended to be received by a selected group of the UEs in a given coverage area of the cellular network. The multicast transmissions may in particular be MBMS transmissions.

In the concepts as illustrated in the following, handling of a connection failure between a gateway node, which conveys traffic user plane of multicast transmissions, and a control node, which controls RAN nodes performing the multicast transmissions, is based on a timer in the gateway node and a timer in the control node. Expiry of the timer in the gateway node triggers a reaction to the connection failure by the gateway node, and expiry of the timer in the control node triggers a reaction to the connection failure by the control node. The timer in the control node is configured with a shorter duration than the timer in the gateway node, which typically ensures that the reaction to the connection failure by the control node comes before the reaction to the connection failure by the gateway node. The reaction to the connection failure by the control node involves that the control node locally deletes context information associated with control plane sessions which are established between the control node and the gateway node and with control plane sessions which are established between the control nodes and the RAN nodes. The deletion being local means that the control node does not send any signaling for terminating control plane sessions to other nodes. For example, the control node does not send requests to the RAN nodes for stopping the control plane sessions with the RAN nodes. The reaction of the gateway node to the connection failure may involve selecting an alternative control node and re-establishing the control plane sessions with the alternative control node. In the case of utilizing an MBMS architecture as for example described in 3GPP TS 23.346, the gateway node may correspond to an MBMS-GW and the control node may correspond to an MME. The RAN nodes may correspond to MCEs. Each of such MCEs may be integrated in a corresponding LTE base station, referred to as eNB (evolved Node B) or may be provided as separate components associated with one or more eNBs.

FIG. 1 schematically illustrates an MBMS architecture which may be used for implementing the concepts as outlined above. The illustrated MBMS architecture includes a RAN 110 of the cellular network. The RAN 110 is based on the LTE radio access technology and is therefore referred to as E-UTRAN (Evolved UMTS Terrestrial Radio Access Network). As further, illustrated also a further RAN 120 may be provided, which is based on the UMTS radio access technology and is therefore referred to as UTRAN (UMTS Terrestrial Radio Access Network). Each of the RANs 110, 120 provides corresponding base stations 112, 122. In the case of the E-UTRAN 110, these base stations are also referred to as eNB. In the case of the UTRAN 120, these base stations are also referred to as NB (Node B). In addition, the RANs may include MCEs 114, 124 which are responsible for coordinating MBMS transmissions. The MCEs 114, 124 may be implemented as standalone components or may be integrated in another RAN node. For example, the illustrated exemplary MCE 114 could be integrated in the illustrated exemplary eNB 112. The RANs 110, 120 may be used by UEs for connecting to the cellular network and receiving MBMS transmissions. By way of example, FIG. 1 illustrates an exemplary UE 11 connected to the E-UTRAN 120, via an interface referred to as LTE Uu, and an exemplary UE 12 connected to the UTRAN 120, via an interface referred to as Uu.

Further, the illustrated MBMS architecture includes an MBMS-GW 160. The MBMS-GW 160 carries user plane traffic of the MBMS transmissions from a BM-SC (Broadcast Multicast Service Centre) 170 to the RANs 110, 120. The user plane traffic may be based on content from a content provider 190. For conveying the user plane traffic of the MBMS transmissions, the MBMS-GW 160 sets up one or more user plane sessions with the RAN nodes 112, 114, 122, 124, which is accomplished via an interface referred to as M1. Between the BM-SC 170 and the MBMS-GW 160, the user plane traffic is transmitted via an interface referred to as SGi-mb. In addition, control plane traffic between the BM-SC 170 and the MBMS-GW 160 may be transmitted via an interface referred to as SGmb.

For controlling the MBMS transmissions of a given MBMS session, a control plane is established by the MBMS-GW 160. In the case of the UTRAN 120, the control plane extends via an SGSN (Serving GPRS Support Node) 140 and interfaces referred to as Sn and Iu. In the case of the E-UTRAN 110, the control plane extends via an MME 150 and interfaces referred to as Sm and M3.

The Sm interface is based GTP and UDP, which makes the Sm interface susceptible to network disturbance. If the connection between the MBMS-GW 160 and the MME 150 via the Sm interface fails, this for example has the effect that the MBMS-GW 160 is not able to send messages to the MME 150, and therefore it is for example not possible to start, stop, or modify MBMS sessions which are controlled by the MME 150. On the other hand, the connection via the M1 interface may be unaffected by the network disturbance so that transmission of the user plane traffic may continue. Similar considerations apply with respect to the Sn interface between the MBMS-GW 160 and the SGSN 140.

In the illustrated concepts, both the MME 150 and the MBMS-GW 160 may react to a connection failure on the Sm interface. These reactions are triggered by different timers: a first time with duration T1 which is implemented in the MME 150, and a second timer with duration T2 which is implemented in the MBMS-GW 160. The first timer is started when the MME 150 detects a connection failure on the Sm interface, and expiry of the first timer triggers a reaction to the connection failure by the MME 150. The second timer is started when the MBMS-GW 160 detects the connection failure on the Sm interface, and expiry of the first timer triggers a reaction to the connection failure by the MBMS-GW 160. The first timer is configured with a shorter duration than the second timer, i.e., T1<T2. Accordingly, the reaction to the connection failure on the Sm interface will first be triggered at the MME 150 and then at the MBMS-GW 160.

The reaction of the MME 150 after T1 expires is to locally delete context information associated with the control plane sessions with the MBMS-GW 160 and with the control plane sessions with the RAN nodes 112, 114. Accordingly, the transmission of user plane traffic over the M1 interface may continue. Further, when the Sm interface recovers from the connection failure, the control plane sessions over the Sm interface may be resumed, e.g., by re-starting them upon request from the MBMS-GW 160.

The reaction of the MBMS-GW 160 after T2 expires is to select an alternative MME (if available), and to re-establish the control plane via this alternative MME. Here, similar procedures as described in 3GPP TS 23.007 may be applied.

Figure 2:
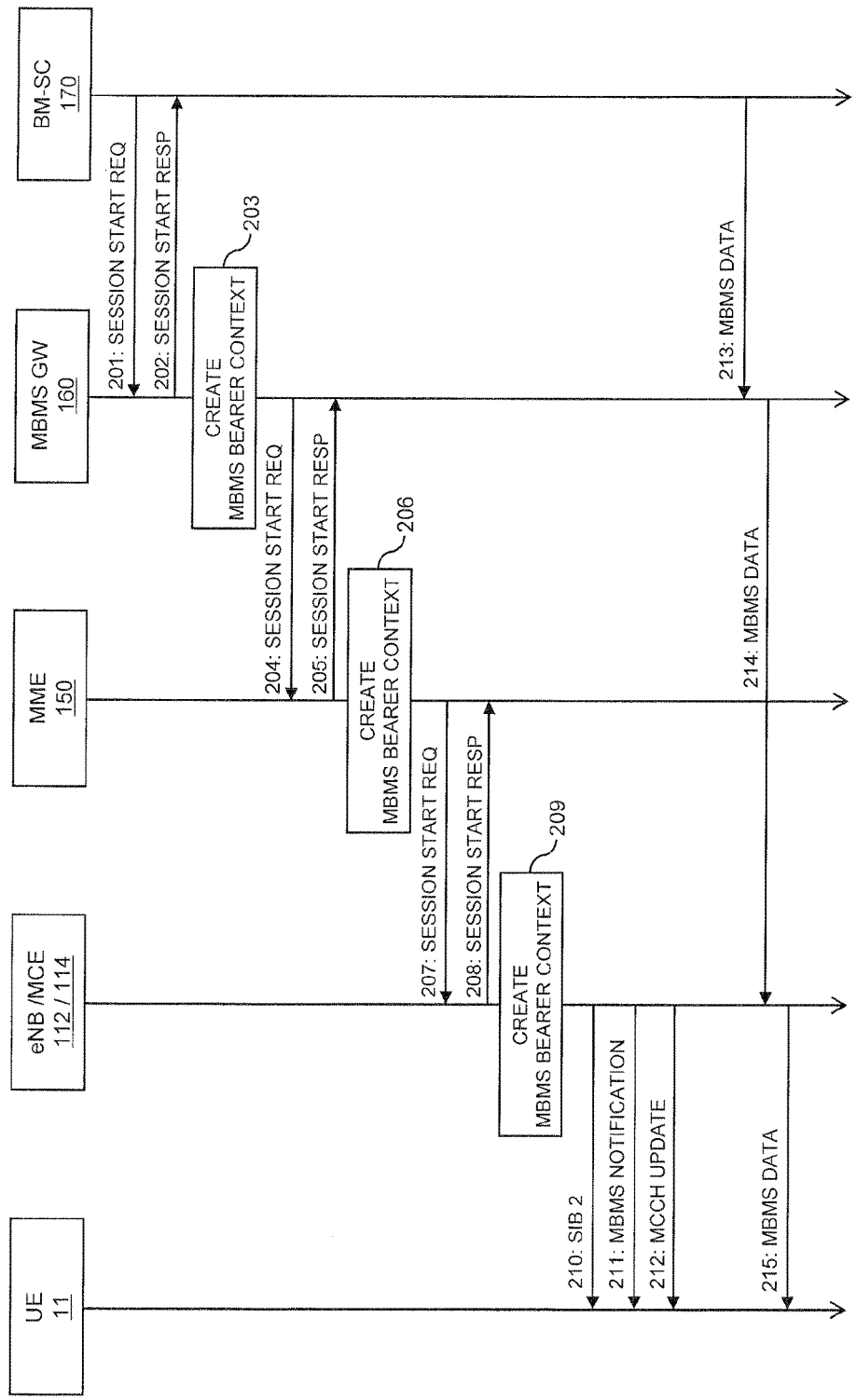
FIG. 2 schematically illustrates exemplary processes of setting up a multicast transmission session in the architecture of FIG. 1.

FIG. 2 shows exemplary processes which may be used to set up an MBMS session when utilizing the MBMS architecture as illustrated in FIG. 1. The processes of FIG. 2 involve the UE 11, the eNB 112 and MCE 114 (which are assumed to be implemented as a single node in this figure), the MME 150, the MBMS-GW 160, and the BM-SC 170. The MME 150 may be part of an MME pool, which also includes other MMEs. The MMEs of the MME pool may co-operate by load sharing.

Initially, the BM-SC 170 sends a session start request 201 to the MBMS-GW 160. The MBMS-GW 160 responds with a session start response 202. As illustrated by step 203, the MBMS-GW 160 then creates an MBMS bearer context associated with the MBMS session.

The MBMS-GW 160 then proceeds by sending a session start request 204 to the MME 150. The MME 150 responds with a session start response 205. The session start request 204 and session start response 205 are transmitted over the Sm interface between the MBMS-GW 160 and the MME 150 and establish a control plane session between the MBMS-GW 160 and the MME 150. As illustrated by step 206, the MME 150 then creates an MBMS bearer context associated with the MBMS session. The session start request 204 may be addressed to one IP (Internet Protocol) address for each participating MME pool.

To implement load sharing, the MBMS-GW 160 may use the IP address of the primary MME to lookup the IP addresses of all the MME pool members, and may then select an MME from the pool. A Round Robin method may be used to distribute the load. Information about MME pool members may be configured locally in the MBMS-GW. In the illustrated example, the MME 150 is assumed to be the selected by the MBMS-GW 160.

The session start request 204 may indicate the forthcoming start of an MBMS transmission and provide information on session attributes. For example, such information may include an IP multicast address to be used for the MBMS transmission, a C-TEID (Common Tunnel Endpoint Identifier) of a GTP-U (GTP user plane) tunnel to be used for the MBMS transmission, or a TMGI (Temporary Mobile Group Identity) to be used for the MBMS transmission. Using such information, the MBMS-GW 160 may keep track of the MME 150 which is used for this MBMS session. Further, in session start request 204 and session start response 205, the MBMS-GW 160 and the MME 150 may exchange a local TEID (Tunnel Endpoint Identifier) and remote TEID to be used as identification in subsequent control plane signaling for the MBMS session. Such information may be stored in the MBMS bearer context stored at the MBMS GW 160 and in the MBMS bearer context stored at the MME 150.

The MME 150 then proceeds by sending a session start request 207 to the participating MCEs and eNBs, such as to the eNB/MME 112/114. The eNB/MCE 112/114 responds with a session start response 208. The session start request 207 and session start response 208 are transmitted over the M3 interface between the MME 150 and the eNB/MCE 112/114 and establish a control plane session between the MME 150 and the eNB/MCE 112/114. As illustrated by step 209, the MME 150 then creates an MBMS bearer context associated with the MBMS session.

The session start request 207 may indicate the forthcoming start of an MBMS transmission and provide information on session attributes. For example, such information may include the IP multicast address to be used for the MBMS transmission, the C-TEID of the GTP-U tunnel to be used for the MBMS transmission, and the TMGI to be used for the MBMS transmission. Further, the session start request 207 may include an identifier of the MME 150, e.g., in the form of an MME MBMS M3AP ID, an indication of the MBMS service area, or QoS parameters. The session start response 208 may include an identifier of the MCE 114, e.g., in the form of an MCE MBMS M3AP ID. Such information may be stored in the MBMS bearer context stored at the MME 150 and at the MCE 114.

The MCE 114 and eNB 112 may then prepare the MBMS transmission by sending an MBSFN (Multicast-Broadcast Single Frequency Network) resource allocation to be used for the multicast transmission to the UE 11. This information may be broadcasted by the eNB 112 in SIB 2 (System Information Block 2).

Subsequently, the MCE 114 and eNB 112 may initiate the MBMS transmission by sending an MBMS notification 211 and an MCCH (Multicast Control Channel) update 212 to the UE 11.

Then the actual MBMS transmission may be performed by transmitting user plane traffic of the MBMS session to the UE 11, as illustrated by transmission of MBMS data 213 from the BM-SC 170 to the MBMS-GW 160, by transmission of MBMS data 214 from the MBMS-GW 160 to the eNB/MCE 112/114, and by transmission of MBMS data 215 from the eNB/MCE 112/114 to the UE 11. The MBMS data 213 may be transmitted in a unicast tunnel. The MBMS data 214 may be transmitted in an IP multicast tunnel (using the above-mentioned C-TEID and IP multicast address), and the MBMS data 215 may be transmitted on the MTCH (Multicast Traffic Channel) of the LTE Uu radio interface.

Figure 3:
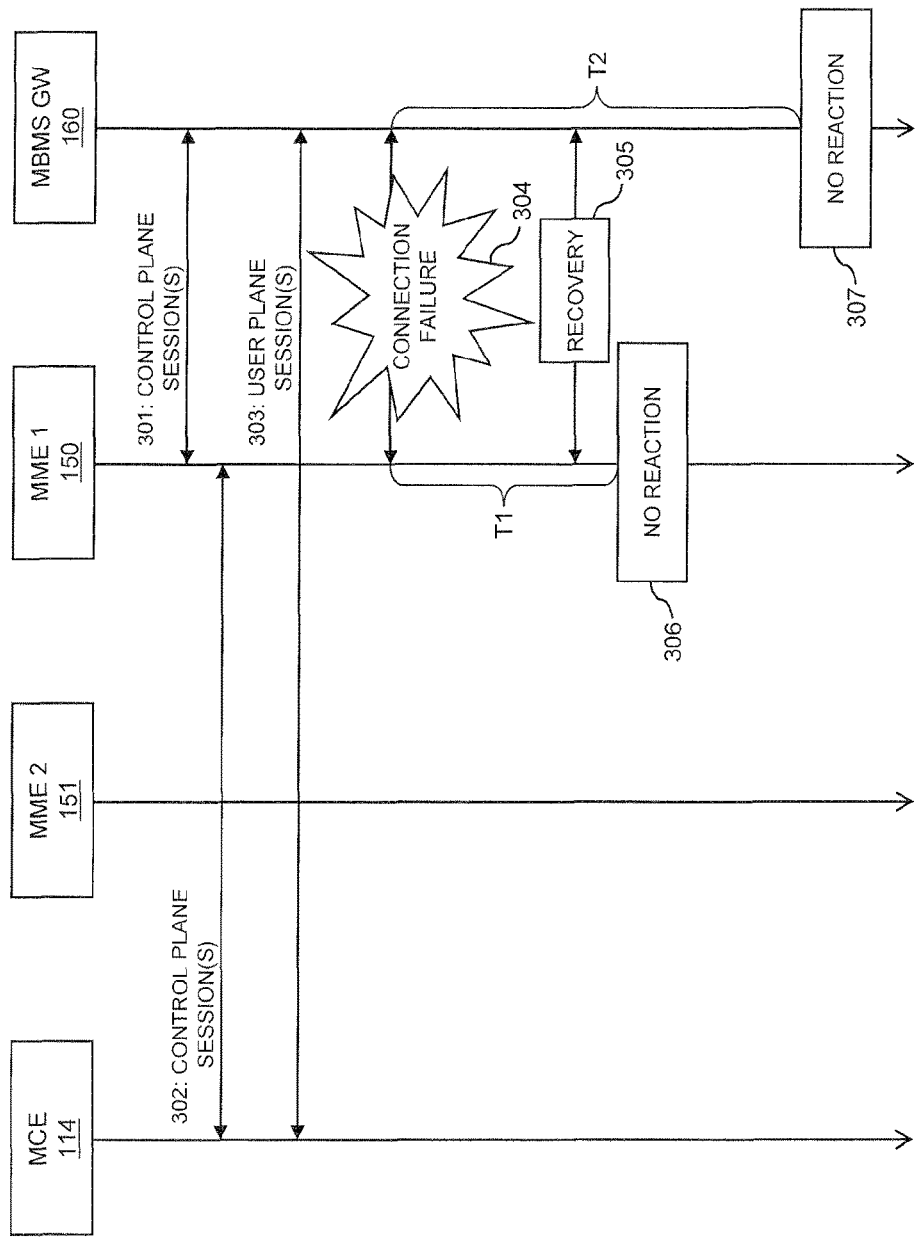
FIG. 3 schematically illustrates exemplary processes of handling a connection failure according to an embodiment of the invention, in which recovery from the connection failure occurs before timer expiry at the control node.
Figure 4:
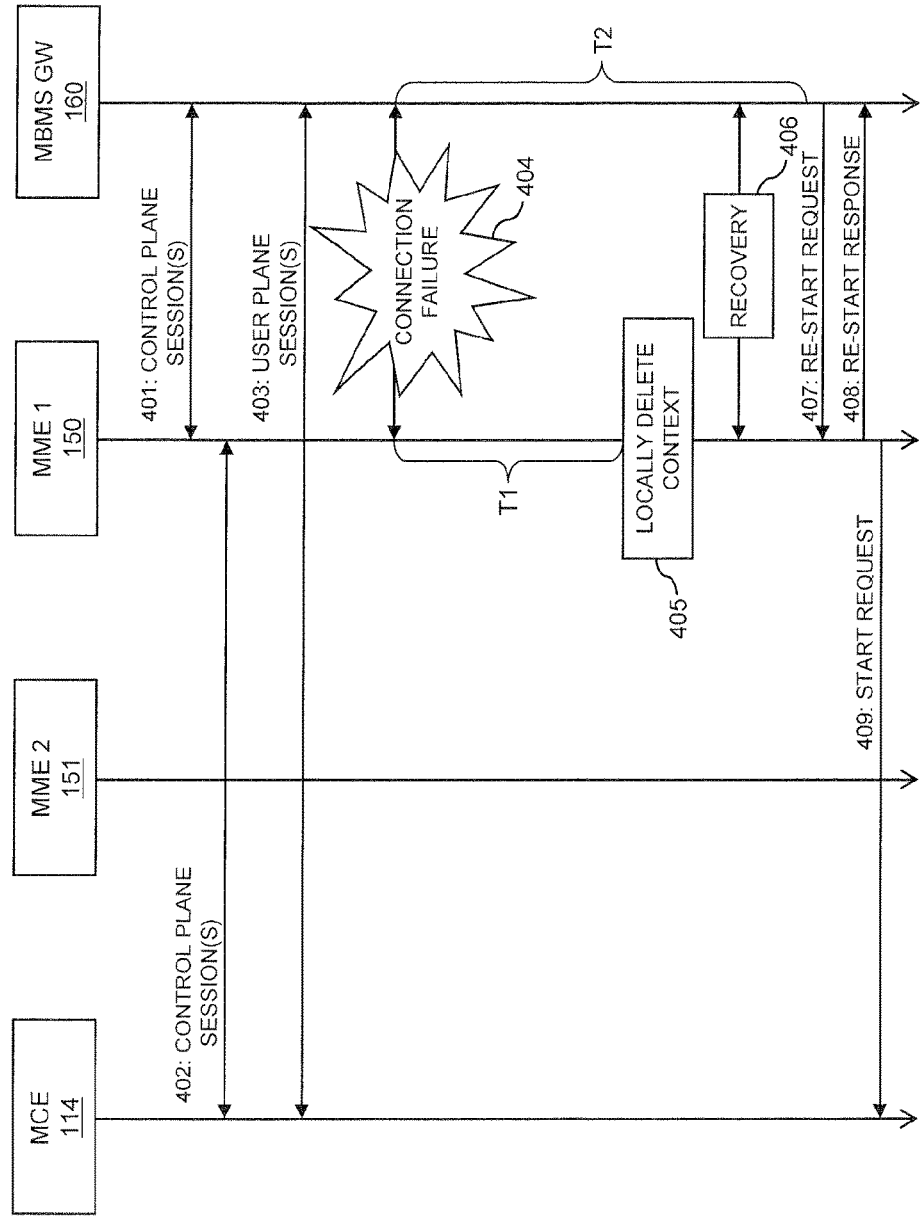
FIG. 4 schematically illustrates exemplary processes of handling a connection failure according to an embodiment of the invention, in which recovery from the connection failure occurs after timer expiry at the control node, but before timer expiry at the gateway node.
Figure 5:
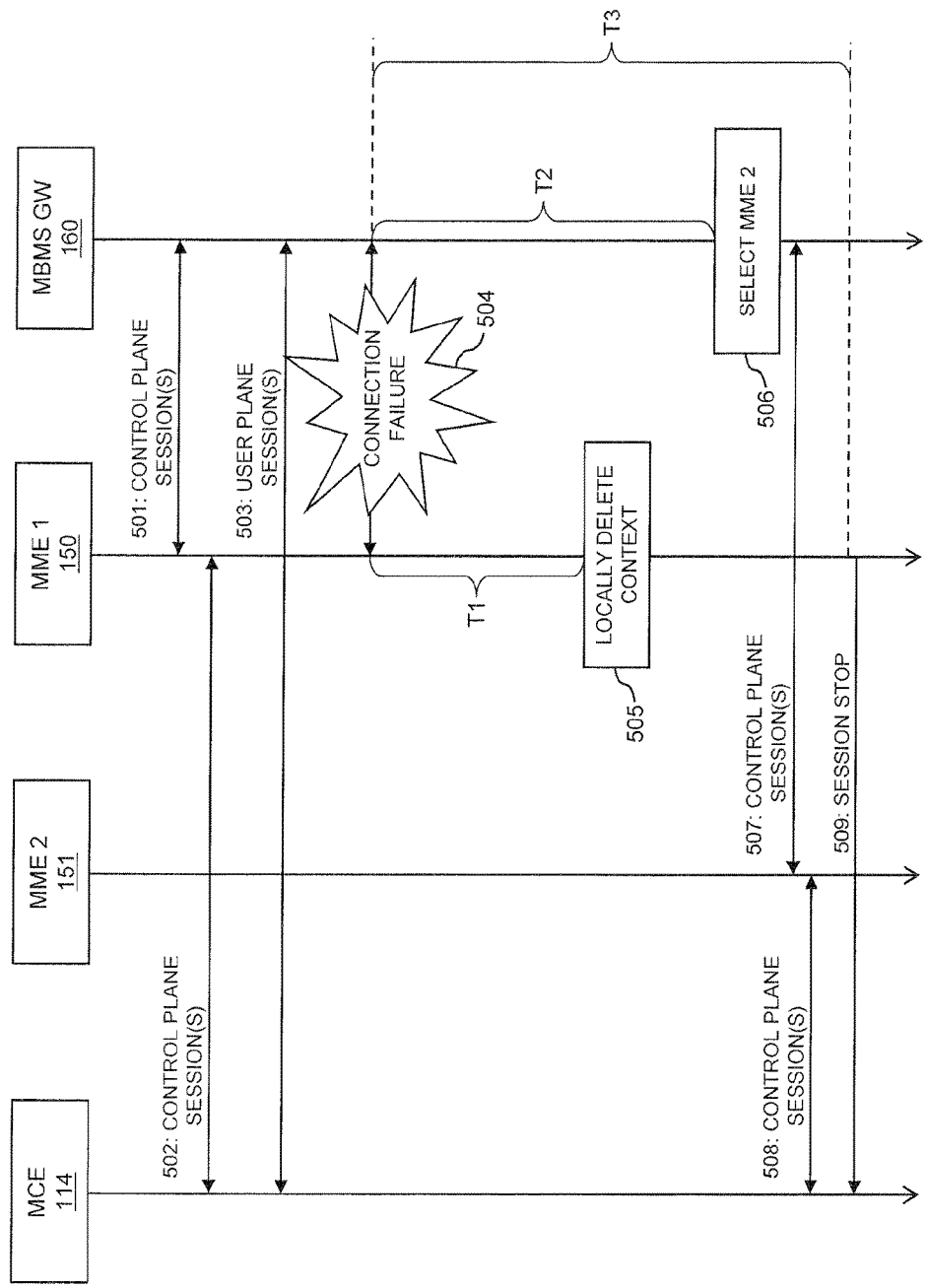
FIG. 5 schematically illustrates exemplary processes of handling a connection failure according to an embodiment of the invention, in which no recovery from the connection failure occurs before timer expiry at the control node and timer expiry at the gateway node.

Subsequent control processes, such as stopping or modifying the MBMS session, typically require further control plane signaling over the Sm interface between the MBMS-GW 160 and the MME 150. With reference to FIGS. 3, 4, and 5, exemplary processes will be further described, which may be used to address a connection failure on the Sm interface in various scenarios. These processes involve the MCE 114, the MME 150 (referred to as MME 1), and the MBMS-GW 160. In addition, also an alternative MME 151 from the same MME pool (referred to as MME 2) may participate in the processes. It should be understood that also in this case, the MCE 114 may be integrated in an eNB, such as in the eNB 112.

FIG. 3 refers to a scenario in which a connection failure occurs on the Sm interface, and recovery from the connection failure occurs before the first timer in the MME 150 expires, and before the second timer in the MBMS-GW 160 expires. Accordingly, in the scenario of FIG. 3, the connection failure may be regarded as a transitory connection failure from the perspective of both the MME 150 and the MBMS-GW 160.

As illustrated, one or more control plane sessions 301 associated with corresponding MBMS sessions are established between the MBMS-GW 160 and the MME 150, and associated control plane sessions 302 are established between the MME 150 and the MCE 114. Further, one or more user plane sessions 303 associated with the MBMS sessions are established between the MBMS-GW 160 and the MCE 114.

In this situation, a connection failure on the Sm interface occurs, as illustrated by 304. Upon detecting the connection failure, the MME 150 starts the first timer with duration T1. Similarly, upon detecting the connection failure, the MBMS-GW 160 starts the second timer with duration T2. For example, the MME 150 and the MBMS-GW 160 may detect the connection failure on the basis of a missing response to a GTP echo message. During the connection failure, the control plane sessions 301 may be suspended, e.g., by keeping the associated MBMS bearer context and/or buffering messages which cannot be transmitted due to the connection failure.

As illustrated by 305, a recovery from the connection failure occurs before expiry of the first timer and before expiry of the second timer. Accordingly, no reaction to the connection failure is triggered at the MME 150, as illustrated by step 306, and no reaction to the connection failure is triggered at the MBMS-GW 160, as illustrated by step 307. After the recovery 305, the control plane sessions 301 may be resumed. For this purpose, the stored MBMS bearer context may be utilized. Further, any buffered messages may be transmitted after the recovery 305.

FIG. 4 refers to a scenario in which a connection failure occurs on the Sm interface, and recovery from the connection failure after the first timer in the MME 150 expires, but before the second timer in the MBMS-GW 160 expires. Accordingly, in the scenario of FIG. 4, the connection failure may be regarded as a transitory connection failure from the perspective of the MBMS-GW 160, but as a non-transitory failure from the perspective of the MME 150.

As illustrated, one or more control plane sessions 401 associated with corresponding MBMS sessions are established between the MBMS-GW 160 and the MME 150, and associated control plane sessions 402 are established between the MME 150 and the MCE 114. Further, one or more user plane sessions 403 associated with the MBMS sessions are established between the MBMS-GW 160 and the MCE 114.

In this situation, a connection failure on the Sm interface occurs, as illustrated by 404. Upon detecting the connection failure, the MME 150 starts the first timer with duration T1. Similarly, upon detecting the connection failure, the MBMS-GW 160 starts the second timer with duration T2. For example, the MME 150 and the MBMS-GW 160 may detect the connection failure on the basis of a missing response to a GTP echo message. During the connection failure, the control plane sessions 401 may be suspended, e.g., by keeping the associated MBMS bearer context and/or buffering messages which cannot be transmitted due to the connection failure.

Upon expiry of the first timer, a reaction by the MME 150 is triggered, as illustrated by step 405. This reaction involves locally deleting the context information of the control plane sessions 401 and of the control plane sessions 402. Since this operation is only local within the MME 150, however no request to stop the control plane sessions 402 is sent to the MCE 114. Accordingly, the MBMS bearer context as stored in the MME 150 is deleted. However, the MBMS bearer contexts in the MCE 114 are maintained, which means that also the user plane sessions may continue.

As illustrated by 406, a recovery from the connection failure then occurs before expiry of the second timer. Accordingly, the reaction to the connection failure by the MBMS-GW 160 is not triggered. However, the MME 150 and the MBMS-GW 160 may detect the recovery 406 and resume the control plane sessions 401. The recovery 406 may for example be detected on the basis of a successfully received response to a GTP echo message. Such GTP echo message or response thereto, or any other signaling message, may also be used by the MME 150 to indicate the connection failure to the MBMS-GW 160. This may for example be useful if the MBMS-GW 160 has not yet detected the connection failure. Also, such indication may be used to inform the MBMS-GW 160 that the MBMS-GW 160 may not be up to date with respect to the control plane sessions 401 and 402 which are active at the MME 150, e.g., in terms of a list of running sessions or just an Sm path failure indicator. For allowing synchronization of the MME 150 and the MBMS-GW 160 with respect to such information, the MME 150 may also indicate all maintained control plane sessions 402 to the MBMS-GW 160, e.g., in terms of a list of running control plane sessions 402.

For resuming the control plane sessions 401, on the side of the MBMS-GW 160 the stored MBMS bearer context may be utilized. However, on the side of the MME 150 the MBMS bearer context was deleted at step 405 and is therefore no longer available. The MBMS-GW 160 may therefore re-start the control plane sessions 401 by sending a re-start request 407 to the MME 150. Such re-start request 407 may be sent based on corresponding information as previously indicated by the MME 150 during recovery 406, i.e., MBMS-GW compares the sessions indicated by the MME 150 to its own sessions as indicated in the MBMS bearer context stored at the MBMS-GW 160 to know which sessions have been lost. Alternatively, the MBMS-GW 160 may infer from the Sm failure indicator that all sessions have been lost. The MME 150 re-starts the control plane sessions indicated by MBMS-GW 160 towards the MCE 114 by sending a session start request 409. As a consequence, the control plane between the MME 150 and the MCE 114 is re-established. The MBMS-GW 160 may also stop those control plane sessions maintained by the MME 150 which were indicated by MME 150 during recovery 406 but are not (or no longer) available in the MBMS-GW 160.

Any messages buffered by the MBMS-GW 160 may be transmitted after the recovery 406. For example, the MBMS-GW 160 may then send any requests for stopping or otherwise modifying any of the ongoing MBMS sessions.

FIG. 5 refers to a scenario in which a connection failure occurs on the Sm interface, but no recovery from the connection failure occurs before the first timer in the MME 150 and the second timer in the MBMS-GW 160 expire. Accordingly, in the scenario of FIG. 5, the connection failure may be regarded as a non-transitory connection failure from both the perspective of the MBMS-GW 160 and the perspective of the MME 150.

As illustrated, one or more control plane sessions 501 associated with corresponding MBMS sessions are established between the MBMS-GW 160 and the MME 150, and associated control plane sessions 502 are established between the MME 150 and the MCE 114. Further, one or more user plane sessions 503 associated with the MBMS sessions are established between the MBMS-GW 160 and the MCE 114.

In this situation, a connection failure on the Sm interface occurs, as illustrated by 504. Upon detecting the connection failure, the MME 150 starts the first timer with duration T1. Similarly, upon detecting the connection failure, the MBMS-GW 160 starts the second timer with duration T2. For example, the MME 150 and the MBMS-GW 160 may detect the connection failure on the basis of a missing response to a GTP echo message. During the connection failure, the control plane sessions 501 may be suspended, e.g., by keeping the associated MBMS bearer context and/or buffering messages which cannot be transmitted due to the connection failure.

Upon expiry of the first timer, a reaction by the MME 150 is triggered, as illustrated by step 505. This reaction involves locally deleting the context information of the control plane sessions 501 and of the control plane sessions 502. Since this operation is only local within the MME 150, however no request to stop the control plane sessions 502 is sent to the MCE 114. Accordingly, the MBMS bearer context as stored in the MME 150 is deleted. However, the MBMS bearer contexts in the MCE 114 is maintained, which means that also the user plane sessions may continue.

Upon expiry of the second timer, a reaction by the MBMS-GW 160 is triggered, as illustrated by step 506. This reaction involves selecting an alternative MME from the same MME pool, in the illustrated example the MME 151. Further, this reaction involves re-establishing the control plane for the MBMS sessions with the alternative MME 151, as illustrated by control plane sessions 507 established between the alternative MME 151 and the MBMS-GW 160 and by control plane sessions 508 between the alternative MME 151 and the MCE 114.

Alternatively or in addition, if the Sm interface recovers from the connection failure after the second timer in the MBMS-GW 160 expired, the MBMS-GW 160 may also indicate to the MME 150 that the alternative MME 151 was selected, and the MME 150 may then locally delete the context information associated with the control plane sessions 501 and 502, i.e., delete the MBMS bearer context of the control plane sessions 501 and 502. If in the MME 150 the context information associated with the control plane sessions 501, 502 is not yet deleted at this point, e.g., due to a misconfiguration of the first and second timers, the indication that the alternative MME 151 was selected may also trigger deletion of the context information in the MME 150.

As illustrated in FIG. 5, in some implementations the MME 150 may also start a third timer with duration T3 when detecting the connection failure. The third timer is configured with a longer duration than the first timer and the second timer, i.e., T3>T2>T1. Expiry of the third timer may trigger a further reaction by the MME 150, which occurs after the above reaction of the MBMS-GW 160 which is triggered by expiry of the second timer, i.e., after the selection of the alternative control node 151. In particular, expiry of the third timer may trigger the MME 150 to request stopping of the control plane sessions 502, by sending a session stop request 509 to the MCE 114. This may be selectively accomplished for those eNBs 112/MCEs 114 which are not capable of handling user plane sessions without a corresponding control plane session. The MME 150 may have previously obtained corresponding information concerning the capabilities of the eNB 112/MCE 114, e.g., by exchanging node capability information during setup of the control plane sessions 502. When the session stop request 509 is received by the MCE 114, also the corresponding MBMS bearer contexts stored in the MCE 114 will be deleted.

Although the above exemplary processes refer to a connection failure on the Sm interface between the MME 150 and the MBMS-GW 160, it is to be understood that corresponding processes could be applied for handling a connection failure on the Sn interface between the MBMS-GW 160 and the SGSN 140, bearing in mind that the SGSN 140 would then control nodes of the UTRAN 120, e.g., one or more NBs such as the NB 122 or one or more MCEs such as the MCE 124.

Figure 6:
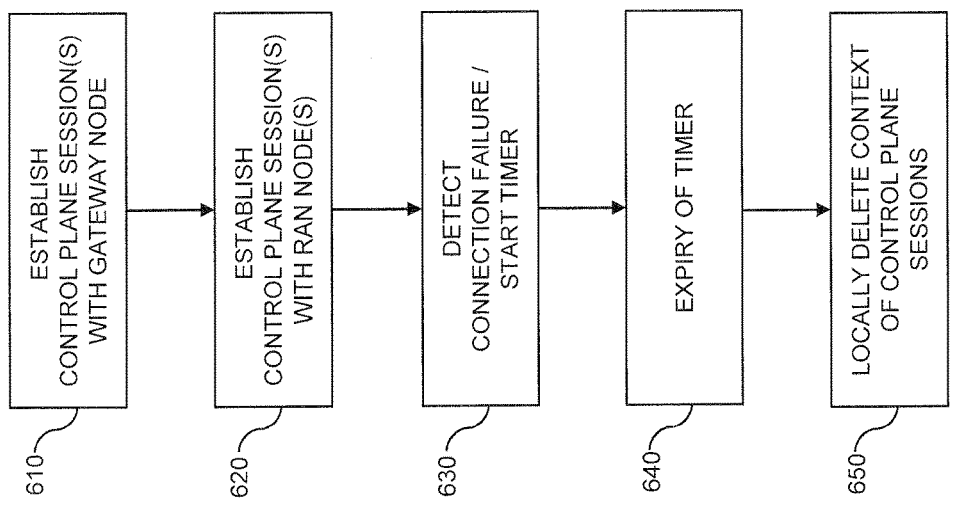
FIG. 6 shows a flowchart for illustrating a method of managing multicast transmissions according to an embodiment of the invention, which may be implemented in a control node of a cellular network.

FIG. 6 shows a flowchart for illustrating a method of managing multicast transmissions in a cellular network. The method of FIG. 6 may be used for implementing the above-described concepts in a control node of the cellular network. The control node may for example be an MME, such as the MME 150, or an SGSN, such as the SGSN 140. If a processor based implementation of the control node is used, the steps of the method may be performed by one or more processors of the control node. For this purpose, the processor(s) may execute correspondingly configured program code. Further, at least some of the corresponding functionalities may be hardwired in the processor(s).

At step 610, the control node establishes one or more control plane sessions with a gateway node of the cellular network. The gateway node may for example be an MBMS-GW of an MBMS architecture, such as the MBMS-GW 160.

At step 620, the control node establishes one or more control plane sessions with one or more RAN nodes to control multicast transmissions by the one or more RAN nodes. This is accomplished on the basis of said one or more control plane sessions with the gateway node. Typically, for each of the control plane sessions with the gateway node, a corresponding control plane session is generated with the one or more RAN nodes. In this way, a control plane for each session of multicast transmissions may be established via the control node between the gateway node and the one or more RAN nodes. The RAN nodes may for example correspond to MCEs, eNBs, or NBs.

At step 630, the control node detects a connection failure to the gateway node. If the control node is an MME and the gateway node an MBMS-GW, the connection failure may be on an Sm interface between the MME and MBMS-GW. If the control node is an SGSN and the gateway node an MBMS-GW, the connection failure may be on an Sn interface between the SGSN and MBMS-GW. The connection failure may for example be detected on the basis of a missing response to a message sent by the control node, e.g., to an GTP echo message. When detecting the connection failure, the control node starts a first timer. The first timer is configured with a shorter duration than a second timer, which is started by the gateway node when detecting the connection failure and triggers a reaction to the connection failure by the gateway node. This reaction to the connection failure by the gateway node may comprise selection of an alternative control node and re-establishing the one or more control plane sessions with the alternative control node.

In some implementations, the control node may also start a third timer when detecting the connection failure. This third timer is configured with a longer duration than the second timer.

At step 640, the first timer expires. Due to the configuration of the timer duration, this typically occurs before the second timer in the gateway node expires and the reaction to the connection failure by the gateway node is triggered.

At step 650, in response to expiry of the first timer, the control node locally deletes context information associated with the one or more control plane sessions with the gateway node and with the one or more control plane sessions with the one or more RAN nodes.

In some scenarios, after locally deleting the context information, the control node may also detect recovery from the connection failure. In this case, the control node may resume the one or more control plane sessions with the gateway node and the one or more control plane sessions with the RAN node. This may be performed in response to receiving, from the gateway node, a request to restart the one or more control plane sessions with the gateway node. This request may allow for restoring context information of the deleted control plane sessions in the control node.

In response to detecting recovery from the connection failure, the control node may also indicate the failure to the gateway node, such as by the above-mentioned Sm path failure indication. In this way, the gateway node may be informed that there may be a mismatch between the control node and the gateway node with respect to information concerning ongoing control plane sessions. From this indication, the gateway node may also infer that all the control plane sessions with the control node, which are still maintained at the gateway node, should be restarted.

In response to detecting recovery from the connection failure, the control node may also indicate one or more maintained control plane sessions with the RAN nodes to the gateway node. At the gateway node, this indication may serve as a basis for determining which control plane sessions should be restarted between the gateway node and the control node.

After indicating the one or more maintained control sessions with the one or more RAN nodes to the gateway node, the control node may also receive an indication to stop one or more maintained control plane sessions. For example, this may be the case if the gateway node decided to stop a certain user plane session during the connection failure and the corresponding control plane session is no longer needed after the recovery from the connection failure.

If the above-mentioned third timer is utilized, expiry of the third timer may trigger a further reaction to the connection failure by the control node. Due to the configuration of the timer durations, this reaction will occur after the reaction of step 650 and also after the reaction to the connection failure by the gateway node. In particular, the further reaction to the connection failure by the control node may involve that, in response to expiry of the third timer, the control node requests the one or more RAN nodes to stop the one or more control plane sessions with the control node, e.g., as illustrated by message 509 of FIG. 5. This reaction to expiry of the third timer may be applied for those RAN nodes which are not capable of handling a user plane session without a corresponding control plane session.

Figure 7:
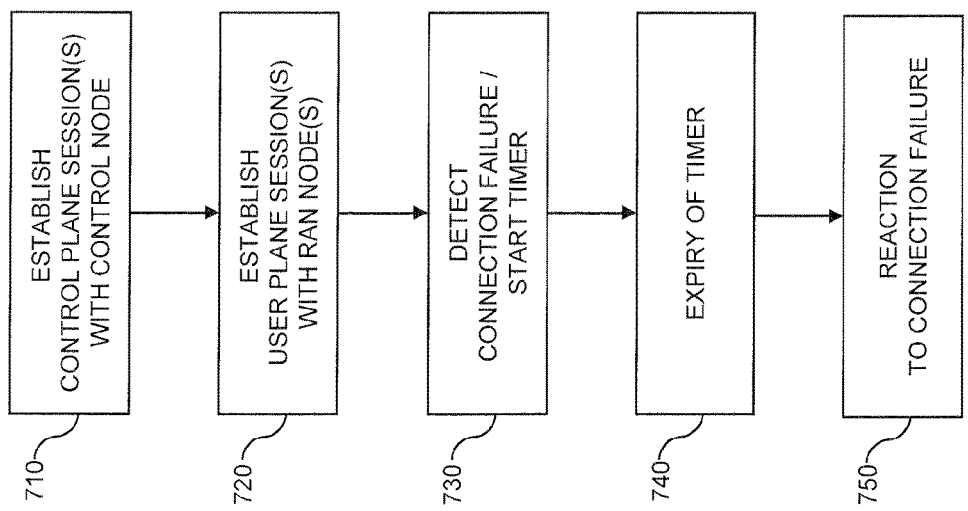
FIG. 7 shows a flowchart for illustrating a method of managing multicast transmissions according to an embodiment of the invention, which may be implemented in a gateway node of a cellular network.

FIG. 7 shows a flowchart for illustrating a method of managing multicast transmissions in a cellular network. The method of FIG. 7 may be used for implementing the above-described concepts in a gateway node of the cellular network. The gateway node may for example be an MBMS-GW of an MBMS architecture, such as the MBMS-GW 160. If a processor based implementation of the gateway node is used, the steps of the method may be performed by one or more processors of the gateway node. For this purpose, the processor(s) may execute correspondingly configured program code. Further, at least some of the corresponding functionalities may be hardwired in the processor(s).

At step 710, the gateway node establishes one or more control plane sessions with a control node of the cellular network. The control node may for example be an MME, such as the MME 150.

At step 720, the gateway node establishes one or more user plane sessions of multicast transmissions by one or more RAN nodes, which are controlled by the control node. The RAN nodes may for example correspond to MCEs, eNBs, or NBs.

At step 730, the gateway node detects a connection failure to the control node. If the gateway node is an MBMS-GW and the control node is an MME, the connection failure may be on an Sm interface between the MBMS-GW and the MME. If the gateway node is an MBMS-GW and the control node is an SGSN, the connection failure may be on an Sn interface between the MBMS-GW and the SGSN. The connection failure may for example be detected on the basis of a missing response to a message sent by the gateway node, e.g., to an GTP echo message. Further, when detecting the connection failure, the gateway node starts a first timer. The first timer is configured with a longer duration than a second timer which is started by the control node when detecting the connection failure and triggers a reaction to the failure by the control node. The reaction to the connection failure by the control node may comprise locally deleting the one or more control plane sessions with the gateway node and with one or more corresponding control plane sessions with the one or more RAN nodes. In some implementations, the control node may also start a third timer when detecting the connection failure. This third timer is configured with a longer duration than the first timer and the second timer and triggers a further reaction to the connection failure by the control node. In particular, the further reaction to the connection failure by the control node may involve that, in response to expiry of the third timer, the control node requests the one or more RAN nodes to stop the one or more control plane sessions with control node, e.g., as illustrated by message 509 of FIG. 5.

At step 740, the first timer expires. Due to the configuration of the timer duration, this typically occurs after the second timer in the control node expires and the reaction to the connection failure by the control node is triggered.

At step 750, in response to expiry of the first timer, the gateway node triggers a reaction to the connection failure by the gateway node. This reaction to the connection failure by the gateway node may comprise selection of an alternative control node and re-establishing the one or more control plane sessions with the alternative control node.

In some scenarios, the gateway node may detect a recovery from the connection failure before expiry of the timer. In this case, the gateway node may resume the one or more control plane sessions with the control node. The gateway node may perform this resuming by sending a request to restart the one or more control plane sessions to the control node.

The gateway node may also receive, from the control node, an indication of one or more control plane sessions with the one or more RAN nodes, which are maintained by the control node after the connection failure. The gateway node may then compare the indicated maintained control plane sessions to the user plane sessions established by the gateway node. Depending on this comparison, the gateway node may send, to the control node, an indication to stop one or more of the maintained control plane sessions. For example, this may be the case if the gateway node decided to stop a certain user plane session during the connection failure and the corresponding control plane session is no longer needed after the recovery from the connection failure.

The methods of FIGS. 6 and 7 may also be combined in a system which includes a control node operating according to the method of FIG. 6 and a gateway node operating according to the method of FIG. 7. Accordingly, in such method the control node establishes one or more control plane sessions with the gateway node, as explained in connection with step 610 of FIG. 6 and step 710 of FIG. 7. On the basis of the one or more control plane sessions with the gateway node, the control node establishes one or more control plane sessions with one or more RAN nodes to control multicast transmissions by the one or more RAN nodes, as explained in connection with step 620 of FIG. 6. The gateway node establishes one or more user plane sessions of the multicast transmissions by the one or more RAN nodes as explained in connection with step 720 of FIG. 7. The control node detects a connection failure to the gateway node and, when detecting the connection failure, starts a first timer, as explained in connection with step 630 of FIG. 6. Also the gateway node detects the connection failure and, when detecting the failure, starts a second timer, as explained in connection with step 730 of FIG. 7. Here, it should be noted that the first timer to which reference is made in connection with FIG. 7 corresponds to the second timer to which reference is made in connection with FIG. 6. Similarly, the second timer to which reference is made in connection with FIG. 7 corresponds to the first timer to which reference is made in connection with FIG. 6. The second timer is configured with a longer duration than the first timer. In response to expiry of the first timer, the control node locally deletes context information associated with the one or more control plane sessions with the gateway node and with the one or more control plane sessions with the one or more RAN nodes, as explained in connection with steps 640 and 650 of FIG. 6. In response to expiry of the second timer, the gateway node triggers a reaction to the connection failure by the gateway node, as explained in connection with steps 740 and 750 of FIG. 7. The reaction to the connection failure by the gateway node may comprise selection of an alternative control node and re-establishing the one or more control plane sessions with the alternative control node.

Figure 8:
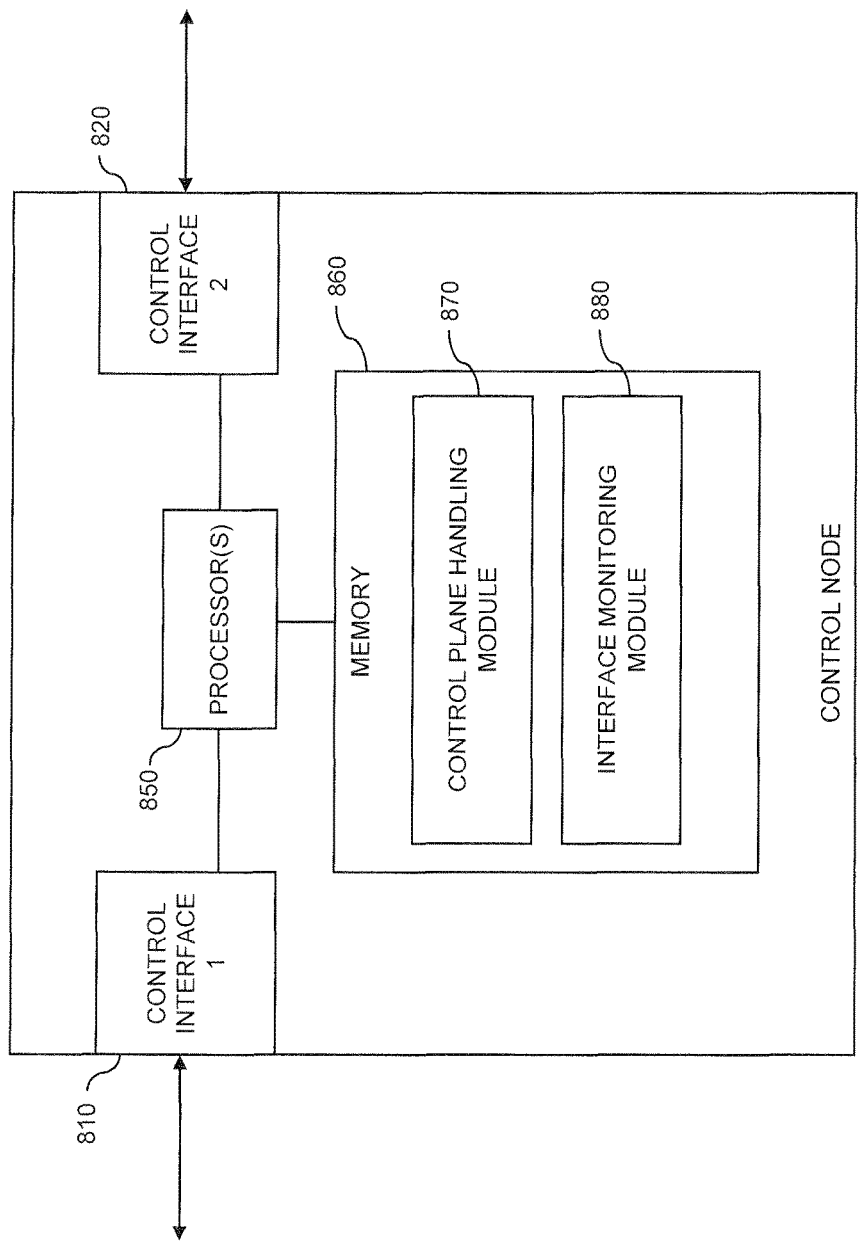
FIG. 8 schematically illustrates structures of a control node according to an embodiment of the invention.

FIG. 8 illustrates exemplary structures for implementing a control node which operates in accordance with the above-described concepts. For example, the illustrated structures may be used to implement an MME, such as the MME 150, or an SGSN, such as the SGSN 140.

As illustrated, the control node may include a first control interface 810 for connecting to a gateway node of the cellular network. This gateway node may be an MBMS-GW of an MBMS architecture, such as the MBMS-GW 160. The first control interface 810 may be used for establishing one or more control plane sessions with the gateway node. If the control node is an MME, the first control interface 810 may implement an Sm interface of the MME. If the control node is an SGSN, the first control interface 810 may implement an Sn interface of the SGSN.

Further, the control node includes one or more processor(s) 850 coupled to the control interfaces 810, 820, and a memory 860 coupled to the processor(s) 850. The memory 860 may include a read-only memory (ROM), e.g., a flash ROM, a random access memory (RAM), e.g., a dynamic RAM (DRAM) or static RAM (SRAM), a mass storage, e.g., a hard disk or solid state disk, or the like. The memory 860 includes suitably configured program code modules to be executed by the processor(s) 850 so as to implement the above-described functionalities of the control node, e.g., as illustrated by the method of FIG. 6. More specifically, the program code modules in the memory 860 may include a control plane handling module 870 so as to implement the above-described functionalities of establishing and handling control plane sessions with the gateway node or with the RAN nodes, e.g., as explained in connection with steps 610 and 620 of FIG. 6. If required, this may also include the deletion of context information or stopping of sessions, e.g., as explained in connection with step 650 of FIG. 6. Further, the program code modules in the memory 860 may include an interface monitoring module 880 so as to implement the above-described functionalities of detecting a connection failure or recovery from such connection failure, e.g., as explained in connection with step 630 of FIG. 6.

It is to be understood that the structures as illustrated in FIG. 8 are merely schematic and that the control node may actually include further components which, for the sake of clarity, have not been illustrated, e.g., further interfaces or further processors. Also, it is to be understood that the memory 860 may include further types of program code modules, which have not been illustrated, e.g., program code modules for implementing known functionalities of an MME or SGSN. In some implementations, also a computer program may be provided for implementing functionalities of the control node, e.g., in the form of a physical medium storing the program code modules to be stored in the memory 860 or by making such program code available for download or streaming.

Figure 9:
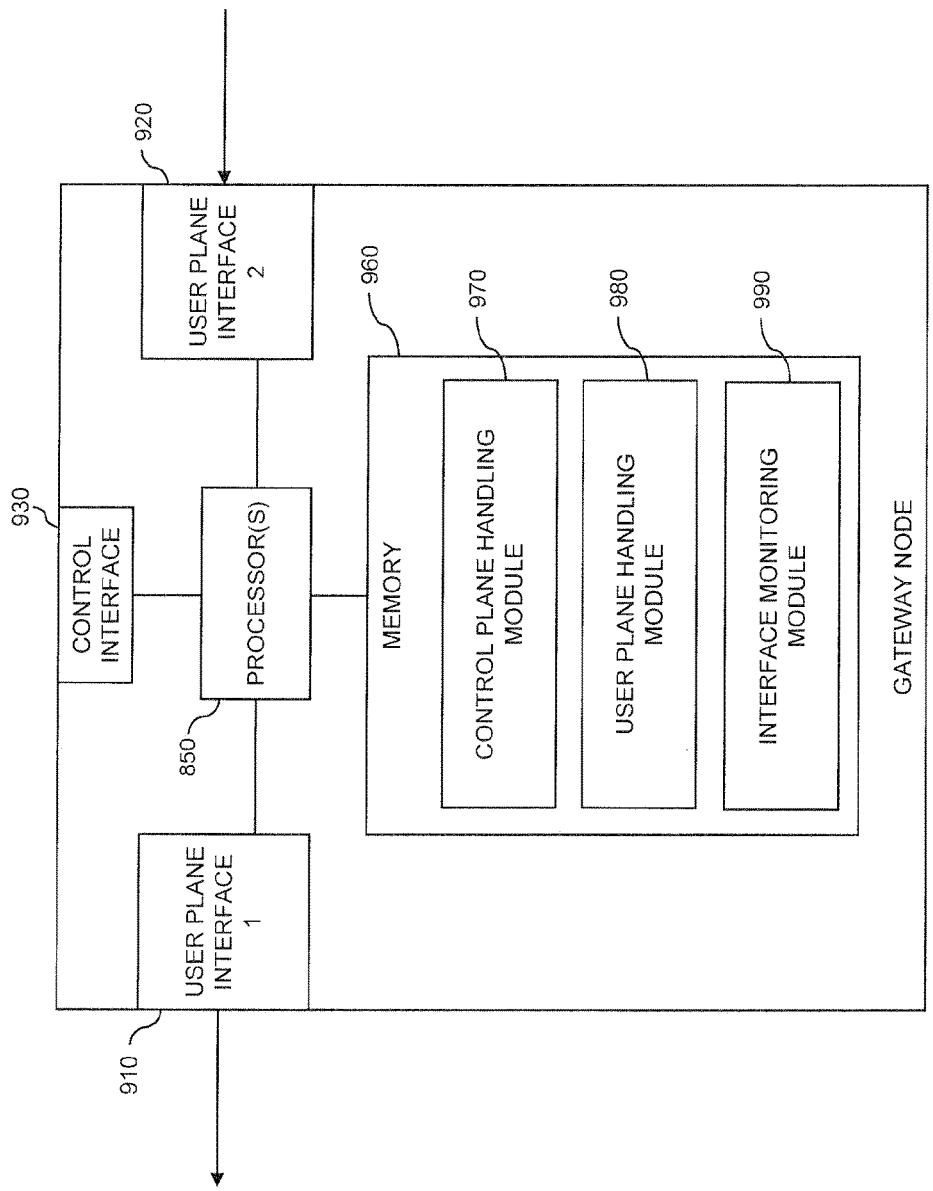
FIG. 9 schematically illustrates structures of a gateway node according to an embodiment of the invention.

FIG. 9 illustrates exemplary structures for implementing a gateway node which operates in accordance with the above-described concepts. For example, the illustrated structures may be used to implement an MBMS-GW, such as the MBMS-GW 160.

As illustrated, the gateway node may include a first user plane interface 910 for connecting to one or more RAN nodes, such as MCEs, eNBs, or NBs. The first user plane interface 910 may be used for establishing one or more user plane sessions of multicast transmissions with the RAN nodes. If the gateway node is an MBMS-GW, the first user plane interface 910 may for example implement an M1 interface of the MBMS-GW. Further, the gateway node may include a second user plane interface 920. The second user plane interface 920 may be used for receiving user plane traffic of the multicast transmissions, e.g., from a content provider, such as the content provider 190, or from a further node of the cellular network, such as the BM-SC 170. If the gateway node is an MBMS-GW, the second user plane interface 920 may for example implement an Sgi-mb interface of the MBMS-GW. As further illustrated, the gateway node may include a control interface 930. The control interface 930 may be used for establishing one or more control plane sessions with a control node of the cellular network. If the control node is an MME, the control interface 930 may implement an Sm interface. If the control node is an SGSN, the control interface 930 may implement an Sn interface. In addition, also other control interface types could be implemented by the control interface 930, e.g., an Sgmb interface with respect to an BM-SC, such as the BM-SC 170.

Further, the gateway node includes one or more processor(s) 950 coupled to the control interfaces 910, 920, and a memory 960 coupled to the processor(s) 950. The memory 960 may include a ROM, e.g., a flash ROM, a RAM, e.g., a DRAM or SRAM, a mass storage, e.g., a hard disk or solid state disk, or the like. The memory 960 includes suitably configured program code modules to be executed by the processor(s) 950 so as to implement the above-described functionalities of the gateway node, e.g., as illustrated by the method of FIG. 7. More specifically, the program code modules in the memory 960 may include a control plane handling module 970 so as to implement the above-described functionalities of establishing and handling control plane sessions with the control node, e.g., as explained in connection with step 710 of FIG. 7. If required, this may also include selection of an alternative control node or stopping of sessions, e.g., as explained in connection with step 750 of FIG. 7. Further, the program code modules in the memory 960 may include a user plane handling module 980 so as to implement the above-described functionalities of establishing one or more user plane sessions of multicast transmissions with one or more RAN nodes, e.g., as explained in connection with step 720 of FIG. 7. Further, the program code modules in the memory 960 may include an interface monitoring module 990 so as to implement the above-described functionalities of detecting a connection failure or recovery from such connection failure, e.g., as explained in connection with step 730 of FIG. 7.

It is to be understood that the structures as illustrated in FIG. 9 are merely schematic and that the gateway node may actually include further components which, for the sake of clarity, have not been illustrated, e.g., further interfaces or further processors. Also, it is to be understood that the memory 960 may include further types of program code modules, which have not been illustrated, e.g., program code modules for implementing known functionalities of an MBMS-GW. In some implementations, also a computer program may be provided for implementing functionalities of the gateway node, e.g., in the form of a physical medium storing the program code modules to be stored in the memory 960 or by making such program code available for download or streaming.

As can be seen, the concepts as described above may be used for efficiently addressing a connection failure on an interface between a gateway and control node which are handling multicast transmissions in a cellular network, e.g., on the Sm interface between an MBMS-GW and an MME or on the Sn interface between an MBMS-GW and an SGSN. In both cases the connection failure may be unrelated to user plane traffic on the M1 interface. In the claimed concepts, the user plane traffic may continue even during the connection failure, which improves user experience.

It is to be understood that the examples and embodiments as explained above are merely illustrative and susceptible to various modifications. For example, the concepts may be applied in various kinds of cellular networks. Moreover, it is to be understood that the above concepts may be implemented by using correspondingly designed software to be executed by one or more processors of an existing device, or by using dedicated hardware.

The invention claimed is:

1. A method of managing multicast transmissions in a cellular network, the method comprising:
   a control node of the cellular network establishing one or more control plane sessions with a gateway node of the cellular network;
   based on the one or more control plane sessions with the gateway node, the control node establishing one or more control plane sessions with one or more radio access network nodes to control multicast transmissions by the one or more radio access network nodes;
   the control node detecting a connection failure between the gateway node and the control node;
   the control node, in response to detecting the connection failure, starting a first timer configured with a shorter duration than a second timer, the second timer started by the gateway node in response to detecting the connection failure and operative to trigger a reaction to the connection failure by the gateway node; and
   the control node, in response to expiry of the first timer, locally deleting context information associated with the one or more control plane sessions with the gateway node and with the one or more control plane sessions with the one or more radio access network nodes.

2. A method of managing multicast transmissions in a cellular network, the method comprising:
   a gateway node of the cellular network establishing one or more control plane sessions with a control node of the cellular network;

the gateway node establishing one or more fuser plane sessions of multicast transmissions by one or more radio access network nodes controlled by the control node;

the gateway node detecting a connection failure between the control node and the gateway node;

the gateway node, in response to detecting the connection failure, starting a first timer configured with a longer duration than a second timer, the second timer started by the control node in response to detecting the connection failure and operative to trigger a reaction to the connection failure by the control node; and the gateway node, in response to expiry of the first timer, triggering a reaction to the connection failure by the gateway node.

3. A method of managing multicast transmissions in a cellular network, the method comprising:

a control node of the cellular network establishing one or more control plane sessions with a gateway node of the cellular network;

the control node, based on the one or more control plane sessions with the gateway node, establishing one or more control plane sessions with one or more radio access network nodes to control multicast transmissions by the one or more radio access network nodes;

the gateway node establishing one or more user plane sessions of the multicast transmissions by the one or more radio access network nodes;

the control node detecting a connection failure between the gateway node and the control node;

the control node, in response to detecting the connection failure, starting a first timer;

the gateway node detecting the connection failure;

the gateway node, in response to detecting the failure, starting a second timer configured with a longer duration than the first timer;

the control node, in response to expiry of the first timer, locally deleting the one or more control plane sessions with the gateway node and with the one or more control plane sessions with the one or more radio access network nodes; and the gateway node, in response to expiry of the second timer, triggering a reaction to the connection failure by the gateway node.

4. The method of claim 3, further comprising the control node, after locally deleting the one or more control plane sessions with the gateway node, detecting recovery from the connection failure and resuming the one or more control plane sessions with the gateway node.

5. The method of claim 4, wherein the control node performs the resuming in response to receiving, from the gateway node, a request to restart the one or more control plane sessions.

6. The method of claim 5, further comprising the gateway node, before expiry of the second timer, detecting recovery from the connection failure and sending the request to restart the one or more control plane sessions to the control node.

7. The method of claim 3, further comprising:

the control node, in response to detecting recovery from the connection failure, indicating one or more maintained control plane sessions with the one or more radio access network nodes to the gateway node;

the gateway node receiving the indication from the control node; and the gateway node comparing the indicated maintained control plane sessions to the user plane sessions established by the gateway node; and the gateway node, based on the comparison, sending an indication to stop one or more of the maintained control plane sessions to the control node.

8. The method of claim 3, further comprising:

the control node, in response to detecting the connection failure, starting a third timer configured with a longer duration than the second timer; and the control node, in response to expiry of the third timer, requesting the one or more radio access network nodes to stop the one or more control plane sessions with the one or more radio access network nodes.

9. A control node for a cellular network, the control node comprising:

an interface to a gateway node;

an interface to one or more radio access network nodes; and at least one processor;

memory containing instructions executable by the at least one processor whereby the control node is operative to:

establish one or more control plane sessions with the gateway node;

based on the one or more control plane sessions with the gateway node, establish one or more control plane sessions with the one or more radio access network nodes to control multicast transmissions by the one or more radio access network nodes;

detect a connection failure between the gateway node and the control node;

in response to detecting the connection failure, start a first timer configured with a shorter duration than a second timer, the second timer started by the gateway node in response to detecting the connection failure and operative to trigger a reaction to the connection failure by the gateway node; and in response to expiry of the first timer, locally delete the one or more control plane sessions with the gateway node and with the one or more control plane sessions with the one or more radio access network nodes.

10. The control node of claim 9, wherein the instructions are such that the control node is operative to, after locally deleting the context information, detect recovery from the connection failure and resume the one or more control plane sessions with the gateway node.

11. The control node of claim 10, wherein the instructions are such that the control node is operative to perform the resuming in response to receiving, from the gateway node, a request to restart the one or more control plane sessions.

12. The control node of claim 10, wherein the instructions are such that the control node is operative to, in response to detecting recovery from the connection failure, indicate the connection failure to the gateway node.

13. The control node of claim 10, wherein the instructions are such that the control node is operative to, in response to detecting recovery from the connection failure, indicate one or more maintained control plane sessions to the gateway node.

14. The control node of claim 13, wherein the instructions are such that the control node is operative to, after indicating the one or more maintained control sessions with the one or more radio access network nodes to the gateway node, receive an indication to stop one or more of the maintained control plane sessions.

15. The control node of claim 9, wherein the instructions are such that the control node is operative to:

in response to detecting the connection failure, start a third timer configured with a longer duration than the second timer; and in response to expiry of the third timer, request the one or more radio access network nodes to stop the one or more control plane sessions with the one or more radio access network nodes.

16. A gateway node for a cellular network, the gateway node comprising:
   an interface to one or more radio access network nodes;
   an interface to a control node which is responsible for controlling the one or more radio access network nodes; and
   at least one processor;
   memory containing instructions executable by the at least one processor whereby the gateway node is operative to:
      establish one or more control plane sessions with the control node;
      establish one or more user plane sessions of multicast transmissions by the one or more radio access network nodes;
      detect a connection failure between the control node and the gateway node;
      in response to detecting the connection failure, start a first timer configured with a longer duration than a second timer, the second timer started by the control node in response to detecting the connection failure and operative to trigger a reaction to the connection failure by the control node; and
      in response to expiry of the first timer, trigger a reaction to the connection failure by the gateway node.

17. The gateway node of claim 16, wherein the reaction to the connection failure by the gateway node comprises selection of an alternative control node and re-establishing the one or more control plane sessions with the alternative control node.

18. The gateway node of claim 16, wherein the reaction to the connection failure by the control node comprises locally deleting context information associated with the one or more control plane sessions with the gateway node and with one or more control plane sessions with the one or more radio access network nodes.

19. The gateway node of claim 16, wherein the first timer is configured with a shorter duration than a third timer, the third timer started by the control node in response to detecting the connection failure and operative to trigger a further reaction to the connection failure by the control node.

20. The gateway node of claim 19, wherein the further reaction to the connection failure by the control node comprises requesting the one or more radio access network nodes to stop the one or more control plane sessions with the one or more radio access network nodes.

21. The gateway node of claim 16, wherein the instructions are such that the gateway node is operative to, before expiry of the timer, detect recovery from the connection failure and resume the one or more control plane sessions with the control node.

22. The gateway node of claim 21, wherein the instructions are such that the gateway node is operative to perform the resuming by sending, to the control node, a request to restart the one or more control plane sessions.

23. The gateway node of claim 21, wherein the instructions are such that the gateway node is operative to receive, from the control node, an indication of one or more control plane sessions with the one or more radio access network nodes which are maintained by the control node after the connection failure.

24. The gateway node of claim 23, wherein the instructions are such that the gateway node is operative to:
   compare the indicated maintained control plane sessions to the user plane sessions established by the gateway node, and
   based on the comparison, send an indication to stop one or more of the maintained control plane sessions to the control node.

25. A system for managing multicast transmissions in a cellular network, the system comprising:
   a control node which is responsible for controlling one or more radio access network nodes;
   a gateway node;
   wherein the control node comprises:
      at least one control node processor;
      control node memory containing instructions executable by the at least one control node processor whereby the control node is operative to:
         establish one or more control plane sessions with the gateway node;
         based on the one or more control plane sessions with the gateway node, establish one or more control plane sessions with the one or more radio access network nodes to control multicast transmissions by the one or more radio access network nodes;
         detect a connection failure between the gateway node and the control node;
         in response to detecting the connection failure, start a first timer configured with a shorter duration than a second timer, the second timer started by the gateway node in response to detecting the connection failure and operative to trigger a reaction to the connection failure by the gateway node; and
         in response to expiry of the first timer, locally delete the one or more control plane sessions with the gateway node and with the one or more control plane sessions with the one or more radio access network nodes;
   wherein the gateway node comprises:
      at least one gateway node processor;
      gateway node memory containing instructions executable by the at least one gateway node processor whereby the gateway node is operative to:
         establish one or more user plane sessions of the multicast transmissions by the one or more radio access network nodes;
         detect the connection failure;
         in response to detecting the connection failure, start the second timer configured with a longer duration than the first timer; and
         in response to expiry of the second timer, trigger the reaction to the connection failure by the gateway node.

* * * * *